(12) United States Patent
Matsuura et al.

(10) Patent No.: US 10,505,435 B2
(45) Date of Patent: Dec. 10, 2019

(54) STATOR STRUCTURE AND RESOLVER INCLUDING A STATOR WITH A PLURALITY OF TEETH

(71) Applicant: MINEBEA MITSUMI INC., Kitasaku-gun, Nagano (JP)

(72) Inventors: Mutsumi Matsuura, Tokyo (JP); Hiroshi Abe, Fukuroi (JP)

(73) Assignee: MINEBEA MITSUMI INC., Kitasaku-gun (JP)

( * ) Notice: Subject to any disclaimer, the term of this patent is extended or adjusted under 35 U.S.C. 154(b) by 287 days.

(21) Appl. No.: 15/474,625

(22) Filed: Mar. 30, 2017

(65) Prior Publication Data
US 2017/0288518 A1 Oct. 5, 2017

(30) Foreign Application Priority Data

Apr. 4, 2016 (JP) .................................. 2016-075372
Mar. 16, 2017 (JP) .................................. 2017-051765

(51) Int. Cl.
*H02K 3/38* (2006.01)
*H02K 3/50* (2006.01)
(Continued)

(52) U.S. Cl.
CPC ................ *H02K 24/00* (2013.01); *G01D 5/20* (2013.01); *H02K 1/146* (2013.01); *H02K 3/18* (2013.01); *H02K 5/225* (2013.01)

(58) Field of Classification Search
CPC .......... G01D 5/20; G01D 5/14; G01D 5/2013; H02K 24/00; H02K 1/146; H02K 3/18;
(Continued)

(56) References Cited

U.S. PATENT DOCUMENTS

| 2002/0043883 A1 | 4/2002 | Shimizu |
| 2013/0049742 A1 | 2/2013 | Ochiai |
| 2015/0061652 A1* | 3/2015 | Otobe ................... G01R 33/02 324/207.17 |

FOREIGN PATENT DOCUMENTS

| CN | 1499696 A | 5/2004 |
| CN | 101588102 A | 11/2009 |

(Continued)

OTHER PUBLICATIONS

Machine translation of JP-2009148081-A. (Year: 2009).*
(Continued)

*Primary Examiner* — Michael Andrews
(74) *Attorney, Agent, or Firm* — Oliff PLC

(57) ABSTRACT

A stator structure includes a stator section, coil cover, terminal block section, plurality of terminals and terminal-block cover section. Stator section includes stator core including first main body section and plurality of teeth sections extending on inner circumference side of first main body section and coils configured by winding wires wound around teeth sections via an insulator. Coil cover covers coils from axial direction of stator core. Terminal block section extends from insulator outward in radial direction of stator core. Plurality of terminals are provided in terminal block section, ends of winding wires configuring coils are bound to terminals. Terminal-block cover section is provided in coil cover, terminal-block cover section covers terminal block section. Terminal-block cover section includes a plurality of isolating members provided on interior, respective plurality of terminals are housed to be separated from one another in respective plurality of spaces formed by plurality of isolating members.

5 Claims, 5 Drawing Sheets

(51) Int. Cl.
*H02K 24/00* (2006.01)
*G01D 5/20* (2006.01)
*H02K 1/14* (2006.01)
*H02K 3/18* (2006.01)
*H02K 5/22* (2006.01)

(58) Field of Classification Search
CPC .............................. H02K 3/32; H02K 3/345; H02K 3/38; H02K 5/225; H02K 11/225; H02K 11/21
USPC .............................................. 310/71, 85, 89
See application file for complete search history.

(56) References Cited

FOREIGN PATENT DOCUMENTS

| CN | 205489934 U | 8/2016 | |
|----|-------------|--------|---|
| JP | S49-124590 A | 11/1974 | |
| JP | S58-110979 U | 7/1983 | |
| JP | H08-171952 A | 7/1996 | |
| JP | 2002-125348 A | 4/2002 | |
| JP | 2004-135402 A | 4/2004 | |
| JP | 2009-023456 A | 2/2009 | |
| JP | 2009023456 A | * | 2/2009 |
| JP | 2009-112139 A | 5/2009 | |
| JP | 2009-148081 A | 7/2009 | |
| JP | 2009148081 A | * | 7/2009 |
| JP | 2013-051749 A | 3/2013 | |
| JP | 2013-198268 A | 9/2013 | |
| JP | 2014-070990 A | 4/2014 | |
| JP | 2014070990 A | * | 4/2014 |
| JP | 2015-045510 A | 3/2015 | |

OTHER PUBLICATIONS

Machine translation of JP-2009023456-A. (Year: 2009).*
Machine translation of JP-2014070990-A (Year: 2014).*
Nov. 2, 2018 Office Action issued in Chinese Patent Application No. 201710205679.1.
Aug. 28, 2018 Office Action issued in Japanese Patent Application No. 2017-051765.
Mar. 19, 2019 Office Action Issued in Japanese Patent Application No. 2017-051765.

* cited by examiner

STATOR STRUCTURE AND RESOLVER INCLUDING A STATOR WITH A PLURALITY OF TEETH

CROSS REFERENCE TO RELATED APPLICATIONS

This application claims the benefit of Japanese Patent Application No. 2016-075372, filed Apr. 4, 2016, and Japanese Patent Application No. 2017-051765, filed Mar. 16, 2017, which are hereby incorporated by reference in their entirety.

BACKGROUND

Technical Field

The present disclosure relates to a stator structure including coil covers and, more particularly, to a stator structure suitable for a resolver and the resolver.

Background

A resolver is known as a rotation angle sensor. For example, the resolver is configured from a stator core including a plurality of teeth sections extending from an annular yoke section toward the center on the inner circumference side and a rotor disposed to be opposed to the teeth sections of a stator on the inner side of the stator core. Winding wires are wound around the teeth sections via an insulator to form coils. The winding wire is configured by an excitation winding wire for inputting an excitation signal and two detection winding wires for outputting two-phase signals according to a rotation angle of the rotor. A sine signal depending on $\sin \theta$ and a cosine signal depending on $\cos \theta$ are respectively output from the detection winding wires. In the resolver, there is known a configuration in which two coil covers for covering the winding wires (the coils) are attached to both sides of the stator core (see, for example, Japanese Patent Application Laid-Open No. 2009-148081).

In the configuration disclosed in Japanese Patent Application Laid-Open No. 2009-148081, as shown in FIG. 7 and the like of Japanese Patent Application Laid-Open No. 2009-148081, a plurality of first column sections and a plurality of first receiving sections are provided in a first coil cover and a plurality of second column sections and a plurality of second receiving sections are provided in a second coil cover. The first and second column sections respectively extend to spaces (slots) among the teeth in which the insulator is provided. After the first and second coil covers are attached to the stator core, ultrasonic vibration is applied to positions where the second receiving sections of the second coil cover are provided. The first column sections of the first coil cover and the second receiving sections of the second coil cover are welded to each other. Consequently, the first and second coil covers are coupled to each other.

On the other hand, as the configuration in which the two coil covers are coupled to each other, there is known a configuration in which snap-fit by locking protrusion bodies and locking step sections is used (see, for example, Japanese Patent Application Laid-Open No. 2004-135402).

In a stator structure for a resolver disclosed in Japanese Patent Application Laid-Open No. 2004-135402, protrusion bodies for locking provided in a first coil cover pierce through slots among teeth in which an insulator is provided and engage with cylindrical protrusion bodies provided in a second coil cover, whereby the two coil covers are coupled. At this point, after locking claws of the protrusion bodies for locking engage with and pierce through ring-like taper sections of the cylindrical protrusion bodies while involving deformation or distortion due to expanding slots, the locking claws are locked to locking step sections on the rear side of the cylindrical protrusion bodies by snap-fit.

Incidentally, in order to realize high reliability in a stator of a resolver, it is necessary to prevent or suppress foreign matter from reaching coils from the inner circumference side of the stator. In order to realize the high reliability, there is a method of providing a protection structure for covering openings of slots with respect to the inner circumference side of the stator. Such a protection structure can also be realized by, for example, the column sections and the receiving sections or the protrusion bodies locking to each other described in Japanese Patent Application Laid-Open No. 2009-148081 and Japanese Patent Application Laid-Open No. 2004-135402 described above.

However, since the column sections and the receiving sections or the protrusion bodies described in Japanese Patent Application Laid-Open No. 2009-148081 and Japanese Patent Application Laid-Open No. 2004-135402 are also used as a structure for coupling the two coil covers, a positional relation between the column sections and the receiving sections or the protrusion bodies is fixed by welding or locking during attachment of the coil covers. Therefore, if errors from design occur in the positions and the sizes of the column sections and the receiving sections or the protrusion bodies because of manufacturing variation of the coil covers or the like, when the welding or the locking is performed, errors sometimes appear as distortions of the shape of the protection structure. Possibility of occurrence and a degree of such distortion increase as the numbers of the column sections and the receiving sections or the protrusion bodies increase. In this case, it is likely that an unintended gap will be formed by the distortion of the protection structure and that foreign matter will intrude into the slots from the gap. At this point, depending on the size of the intruding foreign matter, the foreign matter is likely to close spaces among a plurality of terminals to which the ends of the winding wires configuring the coils are bound to electrically connect the coils to the outside. When the foreign matter closing the spaces among the terminals is made of metal, the terminals electrically short-circuit. Consequently, the reliability of the resolver is likely to deteriorate.

SUMMARY

The present disclosure is related to providing a stator structure and a resolver having higher reliability.

According to one aspect of the present disclosure, a stator structure includes: a stator section including: a stator core including a first main body section and a plurality of teeth sections extending on an inner circumference side of the first main body section; and coils configured by winding wires wound around the teeth sections via an insulator; a coil cover that covers the coils from an axial direction of the stator core; a terminal block section extending from the insulator outward in a radial direction of the stator core; a plurality of terminals provided in the terminal block section, ends of the winding wires configuring the coils being bound to the terminals; and a terminal-block cover section provided in the coil cover, the terminal-block cover section covering the terminal block section. The terminal-block cover section includes a plurality of isolating members provided on an interior. The respective plurality of terminals are housed to be separated from one another in a respective plurality of spaces formed by the plurality of isolating members.

In the stator structure according to one aspect of the present disclosure, the terminal block section may include a plurality of concave sections respectively provided among the respective plurality of terminals. Distal end sides of the respective plurality of isolating members may be inserted into the respective plurality of concave sections.

In the stator structure according to one aspect of the present disclosure, gaps may be formed between inner sides of the respective plurality of concave sections and the respective plurality of isolating members inserted into the respective concave sections.

In the stator structure according to one aspect of the present disclosure, the isolating members may be ribs formed integrally with the terminal-block cover section.

According to one aspect of the present disclosure, a resolver includes the stator structure explained above.

According to the present disclosure, it is possible to realize a stator structure and a resolver having higher reliability.

DETAILED DESCRIPTION

Figure 1:
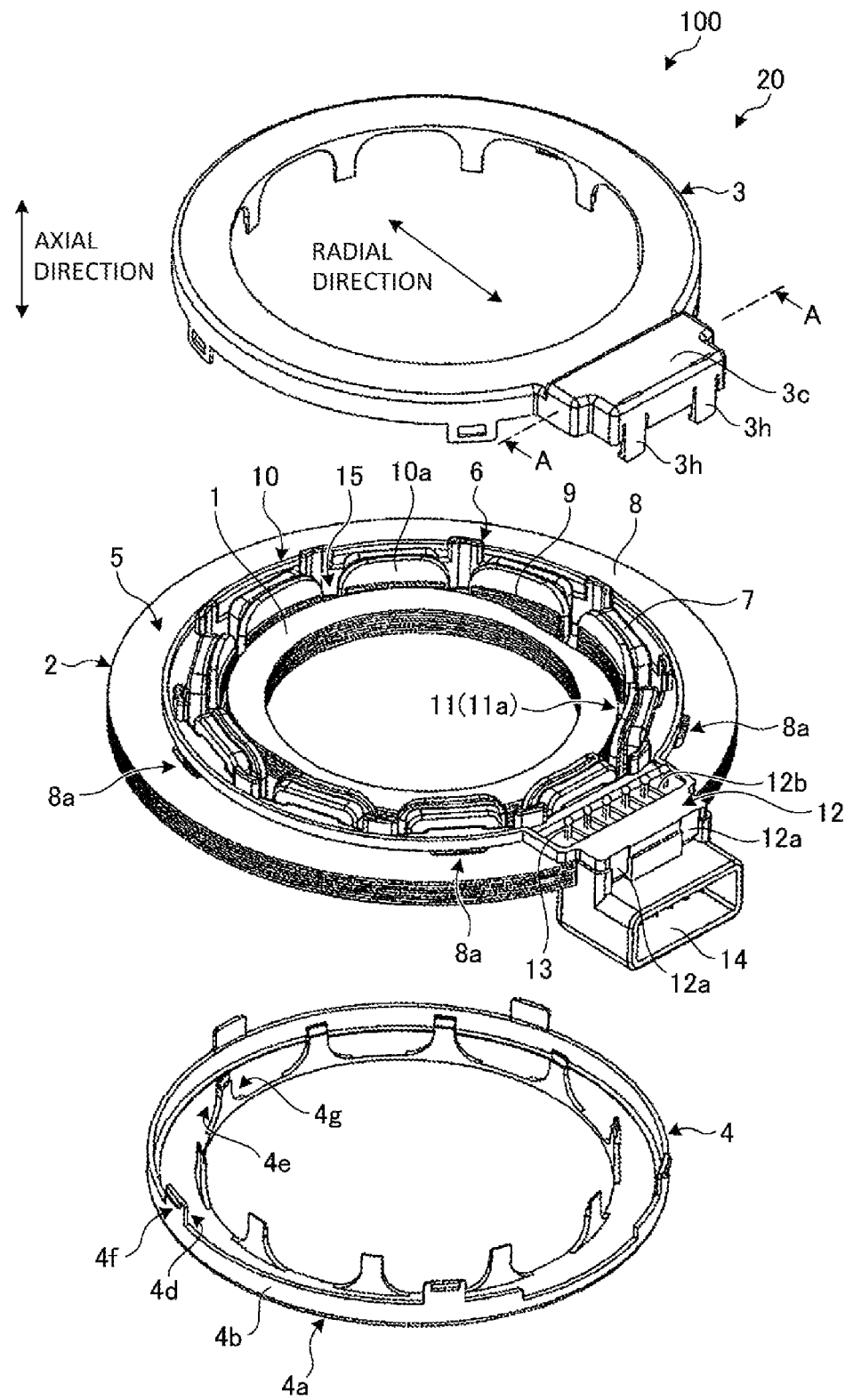
FIG. 1 is a schematic exploded perspective view of a resolver according to an embodiment.

An embodiment of a stator structure and a resolver according to the present disclosure are explained in detail below with reference to the drawings. Note that the present disclosure is not limited by the embodiment. In the drawings, the same or corresponding elements are denoted by the same reference numerals and signs as appropriate.

(Embodiment)

FIG. 1 is a schematic exploded perspective view of a resolver according to an embodiment. As shown in FIG. 1, a resolver 100 is a VR (variable reluctance) type resolver including a rotor 1, a stator section 2, a first coil cover 3, and a second coil cover 4. The stator section 2, the first coil cover 3, and the second coil cover 4 configure a stator structure 20. That is, the resolver 100 includes the stator structure 20.

The rotor 1 has a stacked structure in which a plurality of steel plates made of a soft magnetic material such as silicon steel plates are stacked. The rotor 1 is attached to a rotating shaft of a not-shown motor and disposed on the inner side of the stator section 2.

The stator section 2 includes a stator core 5, an insulator 6, and coils 7. The stator core 5 has a stacked structure in which a plurality of steel plates made of a soft magnetic material such as silicon steel plates are stacked. The stator core 5 includes an annular first main body section 8 and a plurality of teeth sections 9 extending toward the center of the first main body section 8 on the inner circumference side of the first main body section 8. In the present embodiment, the stator core 5 includes ten teeth sections 9. However, the number of the teeth sections 9 is not particularly limited. The teeth sections 9 are disposed at an equal angle interval in the circumferential direction of the first main body section 8. In the first main body section 8, a plurality of through-holes 8a are formed to pierce through between two main surfaces of the first main body section 8. The through-holes 8a are located further on the outer circumference side than the surface of the first main body section 8 on which the insulator 6 explained below is provided. In the present embodiment, five through-holes 8a are formed. However, the number of the through-holes 8a is not particularly limited. In the present embodiment, the through-holes 8a are disposed at an equal angle interval in the circumferential direction of the first main body section 8. In the following explanation, the axial direction and the radial direction of the stator core 5 are specified as shown in FIG. 1. Note that the axial direction coincides with the axial direction of a rotating shaft of a motor connected to the rotor 1. The radial direction coincides with a direction orthogonal to the axial direction. Note that the radial direction means all directions parallel to a surface orthogonal to the axial direction. However, in FIG. 1, one of the radial directions is indicated by a line with arrows at both ends.

The insulator 6 is made of resin, which is an insulating material. The insulator 6 is configured by a first insulator 10 and a second insulator 11. The first insulator 10 and the second insulator 11 are respectively formed on the surfaces on both sides in the axial direction of the stator core 5. The first insulator 10 and the second insulator 11 have shapes substantially symmetrical to each other across the stator core 5. Specially, the first insulator 10 and the second insulator 11 respectively include projecting sections 10a and 11a formed to cover four side surfaces of the teeth sections 9 and projecting in a direction crossing (in the present embodiment, a direction orthogonal to) an extending direction (the radial direction) of the teeth sections 9 on the distal end face side (the radial direction inner circumference side) of the teeth sections 9. The first insulator 10 and the second insulator 11 can be molded by injection molding of resin.

The coils 7 are configured by winding wires wound around the teeth sections 9 via the first insulator 10 and the second insulator 11.

The first insulator 10 includes a terminal block section 12 extending outward in the radial direction of the stator core 5. A plurality of (in the present embodiment, six) terminals 13 are planted in the terminal block section 12. A female connector housing 14 is also formed in the terminal block section 12. The terminal block section 12 can be molded simultaneously with the first insulator 10. At one end of the terminals 13, ends of the winding wires configuring the coils 7 corresponding to the terminals 13 are bound to be tied. Other ends of the terminals 13 project to the inside of the connector housing 14. The other ends of the terminals 13 are connected to external connectors.

Spaces (slots) 15 are formed among the teeth sections 9. The slots 15 communicate with the inner side of the stator core 5 through openings among the projecting sections 10a and 11a of the teeth sections 9 when the first coil cover 3 and the second coil cover 4 are not attached.

The first coil cover 3 and the second coil cover 4 are explained. A constituent material of the first coil cover 3 and the second coil cover 4 is not limited. However, in the present embodiment, the first coil cover 3 and the second coil cover 4 are made of resin and molded by, for example, injection molding of the resin. As the resin, for example, insulating resin can be used. The first coil cover 3 and the second coil cover 4 are attached to the stator section 2 to cover the coils 7 of the stator section 2 from both the sides in the axial direction of the stator core 5.

Figure 2:
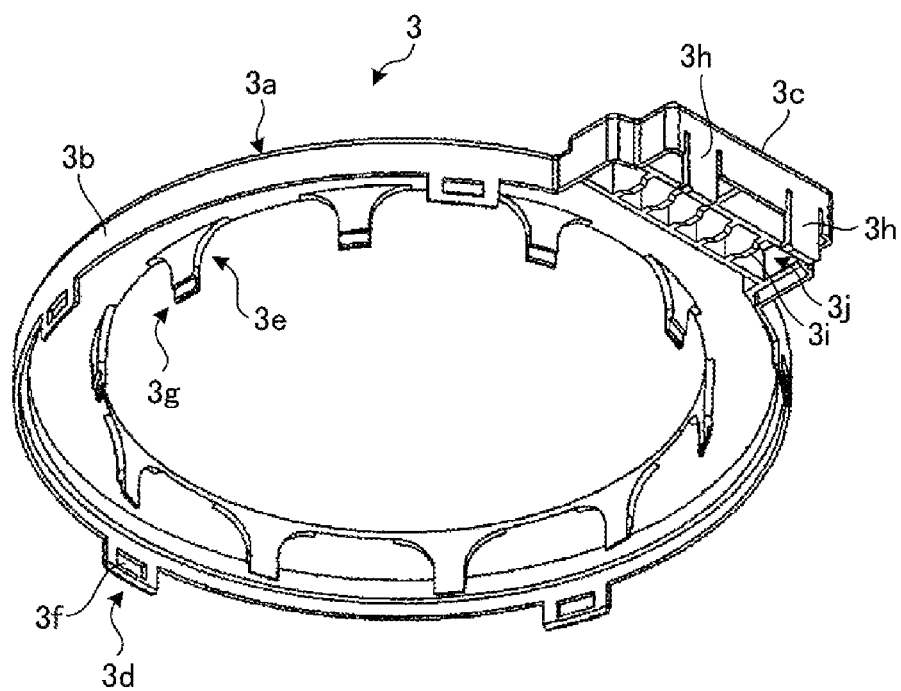
FIG. 2 is a schematic perspective view of a first coil cover.

FIG. 2 is a schematic perspective view of the first coil cover 3. In the first coil cover 3, a second main body section 3a is annular as a whole. The second main body section 3a includes, at the outer circumferential edge, an outer circumferential wall 3b extending in the axial direction. The second main body section 3a includes, in a part of the outer circumferential wall 3b, a terminal-block cover section 3c that covers the terminal block section 12 as explained above.

The first coil cover 3 includes a plurality of (in the present embodiment, five) tabular first engaging sections 3d provided in the second main body section 3a and extending in the axial direction from the outer circumferential wall 3b. Openings 3f are formed at the distal ends of the first engaging sections 3d. In the present embodiment, the first engaging sections 3d are disposed at an equal angle interval in the circumferential direction of the first coil cover 3. The first coil cover 3 includes a plurality of (in the present embodiment, ten) first protecting sections 3e extending in the axial direction as in the case of the first engaging sections 3d from the inner circumferential edge of the second main body section 3a. In the present embodiment, the first protecting sections 3e are disposed at an equal angle interval in the circumferential direction of the first coil cover 3. The first protecting sections 3e gradually increase in width in the circumferential direction toward the second main body section 3a side.

Two engaging claws 3h are formed on the outer circumferential surface of the terminal-block cover section 3c. On the other hand, two engaging sections 12a to be engaged with the engaging claws 3h are formed on the outer circumference side of the terminal block section 12 (see FIG. 1). Further, ribs 3i functioning as isolating members, in the present embodiment, five ribs 3i, are provided on the inside of the terminal-block cover section 3c. Six spaces 3j are formed on the inside of the terminal-block cover section 3c by the ribs 3i. Note that all of the terminal-block cover section 3c, the engaging claws 3h, and the ribs 3i can be simultaneously molded during molding of the first coil cover 3.

Referring to FIG. 1, in the second coil cover 4, a second main body section 4a is annular as a whole. The second main body section 4a includes, at the outer circumferential edge, an outer circumferential wall 4b extending in the axial direction. The inner diameter and the outer diameter of the second main body section 4a of the second coil cover 4 are respectively substantially the same as the inner diameter and the outer diameter of the second main body section 3a of the first coil cover 3.

The second coil cover 4 includes a plurality of (in the present embodiment, five) tabular second engaging sections 4d provided in the second main body section 4a and extending in the axial direction from the outer circumferential wall 4b. Engaging claws 4f are formed at the distal ends of the second engaging sections 4d. In the present embodiment, the second engaging sections 4d are disposed at an equal angle interval in the circumferential direction of the second coil cover 4. The second coil cover 4 includes a plurality of (in the present embodiment, ten) tabular second protecting sections 4e extending in the axial direction as in the case of the second engaging sections 4d from the inner circumferential edge of the second main body section 4a. In the present embodiment, the second protecting sections 4e are disposed at an equal angle interval in the circumferential direction of the second coil cover 4. The second protecting sections 4e gradually increases in width in the circumferential direction toward the second main body sections 4a side.

The first coil cover 3 and the second coil cover 4 are brought close to the stator section 2 from both sides in the axial direction, the first protecting sections 3e of the first coil cover 3 are inserted among the projecting sections 10a of the teeth sections 9, and the second protecting sections 4e of the second coil cover 4 are inserted among the projecting sections 11a of the teeth sections 9 when the first coil cover 3 and the second coil cover 4 are attached to the stator section 2. At the same time, the first engaging sections 3d of the first coil cover 3 and the second engaging sections 4d of the second coil cover 4 are inserted into the through-holes 8a of the first main body section 8 of the stator core 5. The engaging claws 4f of the second engaging sections 4d are engaged in the openings 3f of the first engaging sections 3d through the through-holes 8a. At this point, the engaging claws 3h of the terminal-block cover section 3c are engaged in the engaging sections 12a of the terminal block section 12.

Consequently, the first coil cover 3 and the second coil cover 4 are coupled by the first engaging sections 3d and the second engaging sections 4d. The terminal block section 12 is covered with the terminal-block cover section 3c. Further, the first protecting sections 3e and the second protecting sections 4e are respectively disposed among the projecting sections 10a of the teeth sections 9 and among the projecting sections 11a of the teeth sections 9. Consequently, the slots 15 are closed with respect to the inner side of the stator core 5 by the first protecting sections 3e and the second protecting sections 4e.

The attachment of the first coil cover 3 and the second coil cover 4 to the stator section 2 can be easily performed by the engagement of the engaging claws 4f and the openings 3f. In the present embodiment, the first engaging sections 3d and the second engaging sections 4d engage with each other on the insides of the through-holes 8a. Therefore, the first coil cover 3 and the second coil cover 4 come off less easily after the attachment.

The coils 7 and the terminal block section 12 are covered by attaching the first coil cover 3 and the second coil cover 4 to the stator section 2. Consequently, the coils 7, the winding wires configuring the coils 7, and the terminal block section 12 are not exposed. Therefore, damage to the coils 7, the winding wires configuring the coils 7, and the terminals 13 is prevented.

Figure 3:
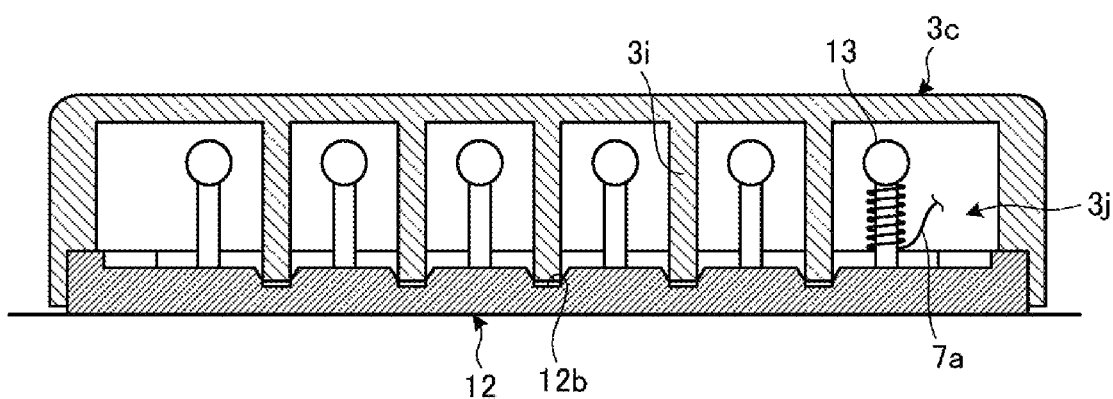
FIG. 3 is an A-A line main part sectional view of the resolver shown in FIG. 1.
Figure 4:
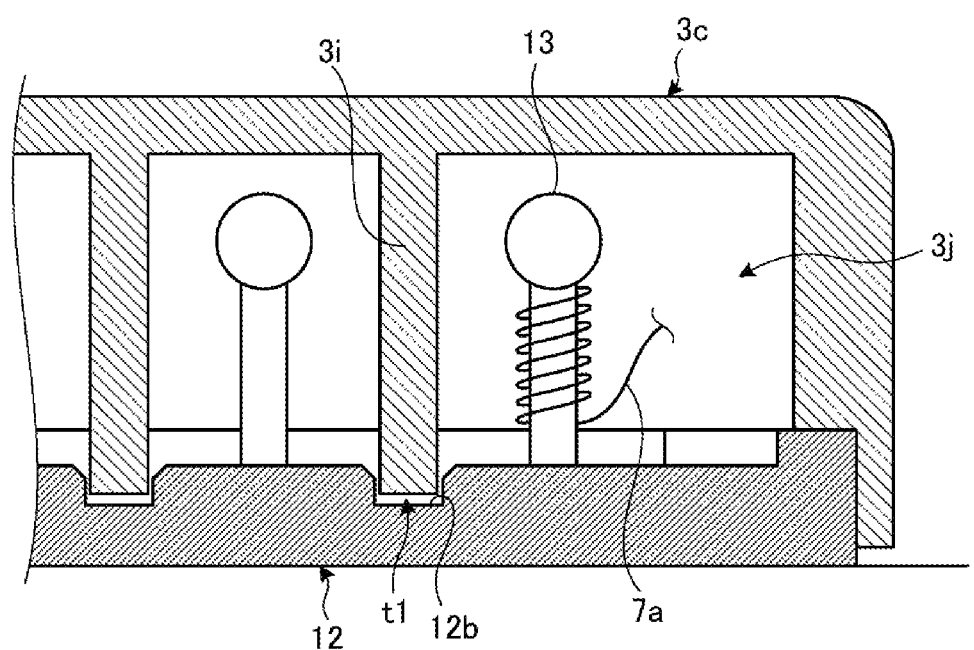
FIG. 4 is a partially enlarged view of FIG. 3.

Further, as shown in FIGS. 3 and 4, in a state in which the terminal block section 12 is covered with the terminal-block cover section 3c, the respective plurality of terminals 13 are housed to be isolated from one another in the respective plurality of spaces 3j formed by the plurality of ribs 3i. Note that reference sign 7a denotes the end of the winding wire forming the coil 7. In FIGS. 3 and 4, only the end 7a of the winding wire bound to one terminal 13 is shown. However, the ends of the winding wires are bound to the respective terminals 13.

In this way, the terminals 13 are housed in the spaces 3j to be isolated from one another by the ribs 3i. Therefore, even if foreign matter made of metal intrudes and reaches the terminal block section 12, it is possible to suppress or prevent the foreign matter from electrically short-circuiting the terminals 13.

As shown in FIGS. 1, 3, and 4, the terminal block section 12 includes a plurality of (in the present embodiment, five) groove-like concave sections 12b respectively provided among the respective plurality of terminals 13. In the state in which the terminal block section 12 is covered with the terminal-block cover section 3c, the distal end sides of the respective plurality of ribs 3i are inserted into the respective plurality of concave sections 12b. Consequently, among the terminals 13, the ribs 3i extend to reach the roots (on the terminal block section 12 side) of the terminals 13. Therefore, an isolation property among the terminals 13 is further improved.

Incidentally, the terminal block section 12, the terminal-block cover section 3c, the ribs 3i, and the like are made of resin. Therefore, in general, it is difficult to manufacture the terminal block section 12, the terminal-block cover section 3c, the ribs 3i, and the like such that positions of the concave sections 12b of the terminal block section 12 and the ribs 3i highly accurately coincide with each other. When the positions of the concave sections and the ribs deviate because of a manufacturing error or the like, the ribs are sometimes not inserted into the concave sections. Consequently, it is likely that an engagement failure and the like between the terminal block section and the terminal-block cover section will occur.

Therefore, in the resolver 100, the width and the length of the concave sections 12b and the thickness and the length of the ribs 3i are designed such that gaps t1 are formed between the inner sides of the concave sections 12b of the terminal block section 12 and the ribs 3i inserted into the concave sections 12b. Consequently, the ribs 3i are more surely inserted into the concave sections 12b. It is possible to prevent occurrence of the engagement failure and the like between the terminal block section 12 and the terminal-block cover section 3c. Note that such gaps t1 have a bent structure as shown in FIG. 4 and form a labyrinth. Therefore, it is possible to suppress or prevent intruding foreign matter from moving among the spaces 3j through the gaps t1.

On the other hand, the projecting sections 10a and 11a of the first insulator 10 and the second insulator 11 have a semielliptical external shape. When the projecting sections 10a and 11a are combined, an elliptical external shape is formed. As explained above, the first protecting sections 3e and the second protecting sections 4e respectively gradually increase in width in the circumferential direction toward the second main body sections 3a and 4a sides. Consequently, the first protecting sections 3e and the second protecting sections 4e have external shapes conforming to the external shapes of the projecting sections 10a and 11a. As a result, it is possible to narrow the gaps among the first and second protecting sections 3e and 4e and the projecting sections 10a and 11a.

Further, as shown in FIG. 1 as well, step sections 3g and 4g forming steps facing each other in the radial direction of the stator core 5 are formed at the respective distal end portions of the first protecting sections 3e and the second protecting sections 4e. Consequently, the step sections 3g and 4g are disposed in a nesting state with each other. The first protecting section 3e and the second protecting section 4e disposed between the same teeth sections 9 and corresponding to the same slot 15 overlap each other in the radial direction of the stator core 5 while separating from each other at a slight interval.

In the resolver 100 according to the present embodiment, since the resolver 100 includes the stator structure 20 having the configuration explained above, even if foreign matter intrudes into the slots 15 and reaches the terminal block section 12, it is possible to suppress or prevent the foreign matter from electrically short-circuiting the terminals 13. Therefore, the resolver 100 has higher reliability.

Figure 5:
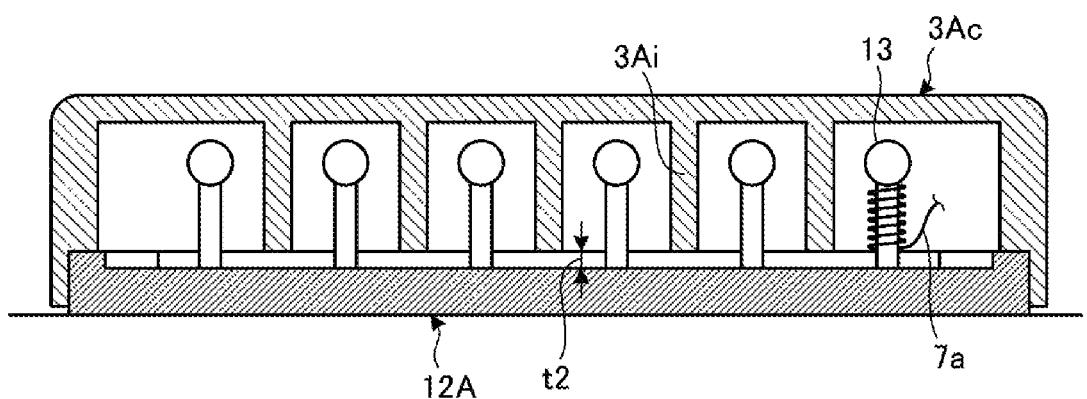
FIG. 5 is a diagram for explaining another embodiment.

Note that, in the embodiment explained above, in the state in which the terminal block section 12 is covered with the terminal-block cover section 3c, the distal end sides of the respective plurality of ribs 3i are inserted into the respective plurality of concave sections 12b of the terminal block section 12. However, the present disclosure is not limited to this. For example, in the embodiment explained above, the terminal block section 12 may be replaced with a terminal block section 12A in which concave sections are not formed as shown in FIG. 5. The terminal-block cover section 3c may be replaced with a terminal-block cover section 3Ac including rib sections 3Ai which are shorter than the rib sections 3i. In this case, even if foreign matter intrudes into the slots 15 and reaches the terminal block section 12, it is possible to suppress or prevent the foreign matter from electrically short-circuiting the terminals 13. Note that, in this case, in order to prevent an engagement failure and the like between the terminal block section 12A and the terminal-block cover section 3Ac, it is desirable to design the length of the rib sections 3Ai such that gaps t2 are formed between the terminal block section 12A and the distal end sides of the rib sections 3Ai. However, it is desirable to set such gaps t2 to the size of a degree for preventing the intruding foreign matter from easily moving among the spaces 3j through the gaps t2.

In the embodiment explained above, the insulator 6 is configured by the first insulator 10 and the second insulator 11. However, the insulator 6 may be molded integrally with the stator core 5 by the insert molding.

In the embodiment explained above, the first insulator 10 and the terminal block section 12 are integrally molded by the insert molding. However, the terminal block section 12 may be separately formed and attached to the first insulator 10. The connector housing 14 may be not formed according to necessity.

The present disclosure is not limited by the embodiment explained above. Those formed by combining the components as appropriate are also included in the present disclosure. Further effects and modifications can be easily derived by those skilled in the art. Therefore, wider aspects of the present disclosure are not limited to those in the embodiment described above. Various changes are possible.

What is claimed is:
1. A stator structure comprising:
 a stator including:
  a stator core including:
   a first main body including a plurality of through-holes; and
   a plurality of teeth extending on an inner circumference side of the first main body; and
  coils configured by winding wires wound around the teeth via an insulator;
 a coil cover that covers the coils from an axial direction of the stator core, the coil cover including:
  a first coil cover including a plurality of first engaging sections; and
  a second coil cover including a plurality of second engaging sections;
 a terminal block extending from the insulator outward in a radial direction of the stator core and disposed on the first main body;
 a plurality of terminals provided in the terminal block, ends of the winding wires configuring the coils being bound to the terminals; and
 a terminal-block cover provided in the coil cover, the terminal-block cover covering the terminal block and including a plurality of isolating members provided on an interior thereof,
 wherein the terminal block includes a plurality of concave sections respectively provided among the respective plurality of terminals, distal end sides of the respective plurality of isolating members are inserted into the respective plurality of concave sections, the respective plurality of terminals are housed to be separated from one another in a respective plurality of spaces formed by the plurality of isolating members, the first engaging sections and the second engaging sections engage with each other on insides of the through-holes, and the coil cover, the terminal-block cover, and the plurality of isolating members are molded integrally.

2. The stator structure according to claim 1, wherein gaps are formed between inner sides of the respective plurality of concave sections and the respective plurality of isolating members inserted into the respective concave sections.

3. The stator structure according to claim 1, wherein the isolating members are ribs formed integrally with the terminal-block cover.

4. A resolver comprising the stator structure according to claim 1.

5. The stator structure according to claim 1, wherein the terminal block includes a connecter housing which is molded integrally with the terminal block.

* * * * *